Nov. 5, 1963

A. D. TUROFF 3,109,539

RECORD ALBUM

Filed Nov. 17, 1960

INVENTOR.
ALLAN DAVID TUROFF
BY Amster & Levy
ATTORNEYS 3,109,539
RECORD ALBUM
Allan David Turoff, 329 Lexington Ave., New York, N.Y., assignor of one-half to Walfredo Toscanni, New York, N.Y.
Filed Nov. 17, 1960, Ser. No. 70,050
6 Claims. (Cl. 206—62)

The present invention relates to a record album or like device for holding record discs and is a continuation in part of the application of Allan David Turoff, Serial No. 771,993, filed November 5, 1958, for Record Holder, which application has been abandoned.

The primary object of the present invention is to provide a record album for preserving the quality of sound which may be reproduced from a record disc.

The surfaces of phonograph records such as "stereo" and "micro-groove" records are extremely delicate and it is necessary to protect the grooved surface of the record disc upon which the sounds are recorded from damage in order to preserve the quality of the sound. It is therefore necessary and desirable that the grooved surfaces of a phonograph record be prevented from coming into contact with other objects during handling and storage of the record. In particular, it is desirable to avoid sliding contact with other objects since such tends to cut scratches along the grooved surfaces thus increasing the surface noise heard during playing of the record. Conventional record jackets and albums are usually of the type having juxtaposed confronting walls and require a lateral insertion and withdrawal of the record disc between the confronting walls during which those walls make sliding contact with the grooved surface of a record. Further, during the entire time that a record disc is stored in this type of holder, the confronting walls will bear against the grooved surface thereof. Accordingly, it is a further object of the invention to provide a record album which will so cradle and support a record that the grooved surfaces thereof are entirely suspended in air and do not have sliding or any other type of contact with surfaces of the record album.

A further object of the present invention is to provide a record holder adapted to maintain the grooved surface of a record in spaced relationship to the record holder on both sides of the record disc so that nothing rests in contact with the grooved surface during storage of the record disc.

Still further objects of the present invention resides in the provision of a record album which may be manufactured from rigid, synthetic plastic material of a size so as to enable a "back-bone" label to be easily applied to the means hinging the front and back cover members of the record album together and which may have a smooth and unridged outside surface thereby allowing for ready application of labels on the front and back cover, which is extremely strong, durable and rigid so as to permit stacking either on end or one on top of the other without any possibility of damage to the records, and which is capable of being manufactured in various sizes by way of mass production thereby rendering such record album satisfactory for wide distribution and utilization.

A further object of the invention resides in the provision of a record album provided with a center retaining spindle so arranged with respect to the front and back covers of the album to maintain the record against jiggling within the album, and from falling out of the album when opened or handled.

An additional object of the invention is to provide a record album which will allow faster, easier and safer removal and replacement of a record in the album as compared with conventional record albums while having incorporated therein a dust barrier providing further protection for the record.

These, together with the various ancillary objects and features of the invention which will become apparent as the following description proceeds, are attained by this record album, a preferred embodiment of which is illustrated in the accompanying drawing, by way of example only, wherein.

Figures 1, 2, 3, 4:
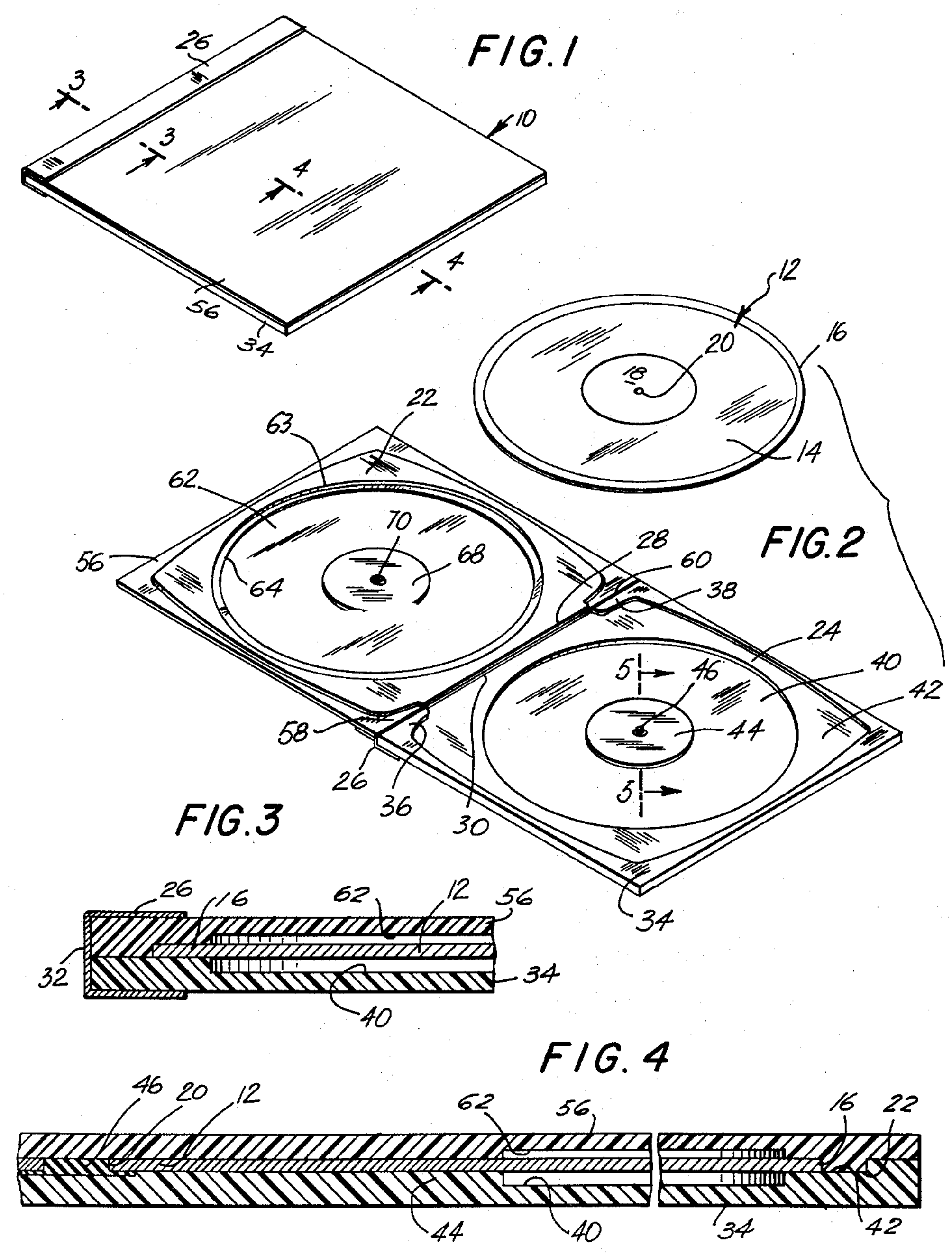
FIG. 1 is a perspective view of the record album comprising the present invention shown in a closed position.
FIG. 2 is a perspective view of the album in an open position illustrating how a record is placed into the album.
FIG. 3 is an enlarged sectional detailed view taken along the plane of line 3—3 in FIG. 1 illustrating the hinge means utilized to hold the front and rear cover members together and also illustrating how a record is supported in the album.
Figure 5:
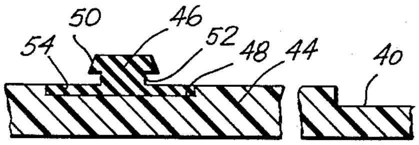

FIG. 4 is an enlarged horizontal sectional detailed view taken along the plane of line 4—4 in FIG. 1 illustrating the center spindle construction and the manner in which the grooved record surfaces are held in spaced relationship with respect to the front and rear cover members of the album; and, FIG. 5 is a sectional detail view taken along the plane of line 5—5 in FIG. 2 illustrating in particular the construction of the spindle.

With continuing reference to the accompanying drawing wherein like reference numerals designate similar parts throughout the various views, there is illustrated a record album generally indicated at 10 which is adapted to be constructed in any desired size or shape for storing various types of phonograph records. A conventional record is generally indicated at 12 and may be a "high-fi" record or may be of a "stereo" or "micro-groove" type. These records are provided with extremely delicate recording portions 14 having grooved surfaces disposed beposed between the peripheral edge or rim 16 of the record and a central portion 18 having a hole 20 therethrough for reception of the spindle of the return table. The central portion 18 is generally provided with a label, and the record 12 may have recording grooves in the recording portions 14 on both sides thereof.

The album 10 is adapted to be manufactured out of various plastics such as any of the synthetic resins including polyvinyl chloride, polyethylene, paperpulp, cardboard, foamed plastics or combinations, or such other materials as may be desired. Of course, the record album can be decorated and colored in any manner as desired and includes a front cover member 22 and a rear cover member 24 hingedly interconnected by means of a hinge 26 along the adjacent edges 28 and 30 of the cover members 22 and 24. The hinge may be formed of cloth, either natural or synthetic, and the hinge is adhesively bonded to the outer surfaces of the front cover member 22 and rear cover member 24 respectively. The front cover member 22 and the rear cover member 24 are preferably constructed so that the outside surfaces thereof are smooth and unridged thereby allowing a ready application of labels to the front and back cover members. Further, either printed on the cloth hinge 26 or affixed thereto may be a suitable "backbone" label which enables the user to readily ascertain the contents of a record stored in the album by an inspection of the hinge end of the record album. This "back-bone" label is applied on the portion 32 of the hinge 26 as can be best seen in FIG. 3 which is wide enough to permit a "back-bone" label which is readily legible to be easily applied.

The rear cover member 24 is provided with a peripheral tongue 34 which extends substantially about the entire periphery thereof and may be contoured in any desired manner so as to have a highly attractive appearance. Of course, adjacent the edge 30, the tongue 34 terminates in projections 36 and 38 which extend upwardly and to some extent parallel to the edge 30. The rear cover member 24 is further provided with a recess 40 therein which corresponds in size to the intermediate portion 14 on which there are formed the recording grooves of the record. The recess 40 is so arranged that the rim or peripheral edge 16 will rest on the supporting portion 42 of the rear cover member 24. Centrally disposed in the recess is a central supporting portion 44 of the same size as the label portion 18 of the record 12. A spindle 46 is bonded or otherwise affixed within a depression 48 formed in the central portion 44. The spindle 46 may be formed of rubber or of a rubber-like, synthetic or natural, resilient material, and preferably has a record engaging portion 50 of a truncated conical shape interconnected by the neck portion 52 to a disc portion 54 which seats in the depression 48.

The front cover member 22 is provided with a peripheral groove 56 therein which is complementary in shape to the tongue 34 and has grooved portions 58 and 60 corresponding to the tongue portions 36, 38 so that when the record album 10 is closed, the tongue 34 fits in the groove 56 to provide an interlock and to also provide a dust barrier or seal. A recess 62 corresponding in size to the recess 40 is also provided in the front cover member 22 and a peripheral ring like cavity 63 which encircles and communicates with the recess 62 is provided in the front cover member for reception of the rim 16 of the record 12 whereby a shoulder 64 is formed. A record is adapted to be held between the shoulder 64 and the surface 42 so that the rim of the record is engaged by the shoulder 64 and cradling the record by the rim thereof and holding the grooved portions 14 of the record in spaced relationship to all the portions of the record album. The front cover member 22 has also integrally formed therewith a central portion 68 of the same shape and size as the central portion 44 and the label portion 18 of the record. A relatively shallow cavity 70 is provided in the center of the central portion 68 for reception of the spindle 46 when the record album is closed.

The record album 10 is adapted to receive a record in the manner shown in FIGS. 3 and 4. The record is disposed on the rear cover member 24 after the album has been opened with the hole 18 being positioned in alignment with the spindle 46. Then, the record is allowed to settle with the label portion 18 resting on the central portion 44 and with the spindle 46 extending through the hole 20. The peripheral edge or rim 16 will rest on the supporting portion 44. When the record album is closed, the record will be grasped by the central portions 68 and 44 and with the rim 16 or peripheral edge of the record being grasped between the shoulder 64 and the supporting portion 42. The spindle 46 is almost of the same size as the space between the rear cover member 24 and the front cover member 22 but preferably is a very little bit longer so that the weight of the front cover member 22 by itself is enough to slightly compress the spindle 46 so that it achieves its shape as is shown in FIG. 4 and firmly frictionally interlocks with the record 12 within the hole 20 therein. The tongue 34 extends into the groove 56 interlocking the entire record album and the tongue 34 provides a dust barrier. Of course, the hinge 26 provides a dust barrier along the edges 28 and 30, and the tongue portion 36 and 38 interlocking with the grooved portions 48 and 60 provide a further interlock and dust barrier along the corners of the record album. Further, the tongue 34 seating within the groove 56 forms assurance that in stacking or storing there will be no strain induced on the hinge 26 due to relative movement of the cover members 22 and 24.

In use, the record 12 is stored and cradled in a manner so that the grooved recording portions thereof are suspended in the air. When it is desired to remove a record, the album is opened and the rim 16 of the record is grasped so as to lift the record 12 off the spindle 46 without touching the grooved surfaces of the recording portions 14.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

What I claim is:

1. A record album for a record disk having a peripheral edge, a central portion provided with a hole therethrough and an intermediate portion provided with recording grooves between said central portion and said peripheral edge, said album comprising a pair of cover members including a front cover member, a rear cover member, means hingedly securing said cover members to each other, said cover members having recesses therein conforming in size to the intermediate portion of a record, said cover members being engageable with the peripheral edge of a record to suspend said intermediate portion within said recesses, a center retaining spindle adapted to extend through the hole in a record, said spindle being formed of a resilient material for frictionally engaging a record, said spindle being secured to one of said cover members to centrally support a record in said album, said spindle resiliently engaging the other of said cover members, a tongue extending about substantially the entire periphery of one of said cover members, the other of said cover members having a complementary groove formed therein for receiving said tongue therein to interlock said cover members while providing a dust barrier.

2. A record album for a record disk having a peripheral edge, a central portion provided with a hole therethrough and an intermediate portion provided with recording grooves between said central portion and said peripheral edge, said album comprising a pair of cover members including a front cover member, a rear cover member, means hingedly securing said cover members to each other, said cover members having recesses therein conforming in size to the intermediate portion of a record, said cover members being engageable with the peripheral edge of a record to suspend said intermediate portion within said recesses, and a center retaining spindle adapted to extend through the hole in a record, said spindle being secured to one of said cover members to centrally support a record in said album, said spindle being formed of a resilient material for frictionally engaging a record, said cover members being formed of a rigid synthetic plastic material, said spindle resiliently engaging the other of said cover members.

3. A record album for a record disk having a peripheral edge, a central portion provided with a hole therethrough and an intermediate portion provided with recording grooves and disposed between said central portion and said peripheral edge, said album comprising a pair of rigid cover members including a front cover member, a rear cover member, means hingedly securing said cover members to each other, said cover members having recesses therein conforming in size to the intermediate portion of a record, said cover members being engageable with the peripheral edge of a record to suspend said intermediate portion within said recesses, and a resilient center retaining spindle adapted to extend through the hole in a record, said spindle being secured to said rear cover member and engaging said front cover member for compression of said spindle to fill the hole in a record.

4. A record album for a record disk having a peripheral edge, a central portion provided with a hole therethrough and an intermediate portion provided with recording grooves and disposed between said central portion and said peripheral edge, said album comprising a pair of rigid cover members including a front cover member, a rear cover member, means hingedly securing said cover members to each other, said cover members having recesses therein conforming in size to the intermediate portion of a record, said cover members being engageable with the peripheral edge of a record to suspend said intermediate portion within said recesses, and a resilient center retaining spindle adapted to extend through the hole in a record, said spindle being secured to said rear cover member and engaging said front cover member for compression of said spindle to fill the hole in a record, a tongue extending about substantially the entire periphery of said rear cover member, said front cover member having a complementary groove formed therein for receiving said tongue therein to interlock said cover members while providing a dust barrier.

5. A record album for a record disk having a peripheral edge, a central portion provided with a hole therethrough and an intermediate portion provided with recording grooves and disposed between said central portion and said peripheral edge, said album comprising a pair of rigid cover members including a front cover member, a rear cover member, means hingedly securing said cover members to each other, said cover members having recesses therein conforming in size to the intermediate portion of a record, said cover members being engageable with the peripheral edge of a record to suspend said intermediate portion within said recesses, a resilient center retaining spindle adapted to extend through the hole in a record, said spindle being secured to said rear cover member and engaging said front cover member for compression of said spindle to fill the hole in a record, a tongue extending about substantially the entire periphery of said rear cover member, said front cover member having a complementary groove formed therein for receiving said tongue therein to interlock said cover members while providing a dust barrier, said recesses being ring shaped, said cover members including opposed centrally disposed portions adapted to cradle the central portion of a record.

6. A record album for a record disk having a peripheral edge, a central portion provided with a hole therethrough and an intermediate portion provided with recording grooves between said central portion and said peripheral edge, said album comprising a pair of cover members including a front cover member, a rear cover member, means hingedly securing said cover members to each other, said cover members having recesses therein conforming in size to the intermediate portion of a record, said cover members being engageable with the peripheral edge of a record to suspend said intermediate portion within said recesses, and a center retaining spindle adapted to extend through the hole in a record, said spindle being secured to one of said cover members to centrally support a record in said album, said spindle being formed of a resilient material and having a first portion extending outwardly from said one cover and being of a diameter less than the diameter of the hole in the record disk, and a second record-retaining portion of a diameter larger than the diameter of the hole in the record disk for holding a record disk to said one cover, said record-retaining portion of said spindle resiliently deforming when a record disk is placed thereon such that said larger diameter second portion extends beyond said hole on the side of said record disk remote from said one cover, said spindle resiliently engaging the other of said cover members for compression of said spindle to fill the hole in a record.

References Cited in the file of this patent

UNITED STATES PATENTS

| | | |
|---|---|---|
| 1,255,690 | Barlow | Feb. 5, 1918 |
| 1,974,160 | Peirson | Sept. 18, 1934 |
| 2,663,416 | Hirsch | Dec. 22, 1953 |
| 2,688,490 | Schumaker | Sept. 7, 1954 |
| 2,691,440 | Spugios | Oct. 12, 1954 |
| 2,785,797 | Rice | Mar. 19, 1957 |